(12) United States Patent
Kondo et al.

(10) Patent No.: US 9,127,585 B2
(45) Date of Patent: Sep. 8, 2015

(54) CATALYST TEMPERATURE ESTIMATING DEVICE AND CATALYST TEMPERATURE ESTIMATING METHOD

(75) Inventors: Shinya Kondo, Gotemba (JP); Masahiro Kachi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1179 days.

(21) Appl. No.: 13/081,563

(22) Filed: Apr. 7, 2011

(65) Prior Publication Data

US 2011/0247317 A1    Oct. 13, 2011

(30) Foreign Application Priority Data

Apr. 7, 2010    (JP) .................................. 2010-088947

(51) Int. Cl.
*F01N 3/00*    (2006.01)
*F01N 11/00*    (2006.01)

(52) U.S. Cl.
CPC .............. *F01N 11/002* (2013.01); *Y02T 10/47* (2013.01)

(58) Field of Classification Search
CPC ............................. F01N 11/002; Y02T 10/47
USPC .................... 60/274, 276, 285, 299
See application file for complete search history.

(56) References Cited

U.S. PATENT DOCUMENTS

| 7,127,882 B2* | 10/2006 | Pfaeffle et al. ................... 60/285 |
| 7,263,434 B2* | 8/2007 | Ripper et al. ................. 701/114 |
| 2005/0150212 A1* | 7/2005 | Pfaeffle et al. ................... 60/286 |

FOREIGN PATENT DOCUMENTS

| JP | 10196433 A | 7/1998 |
| JP | 11-062686 A | 3/1999 |
| JP | 2003343242 A | 12/2003 |

* cited by examiner

*Primary Examiner* — Thomas Denion
*Assistant Examiner* — Diem Tran
(74) *Attorney, Agent, or Firm* — Gifford, Krass, Sprinkle, Anderson & Citkowski, P.C.

(57) ABSTRACT

A catalyst temperature estimating device that estimates the temperature of an upstream end of a catalyst for purifying exhaust gas of an internal combustion engine in an exhaust gas flow direction by executing a smoothing process for upstream end temperature estimation; the temperature of a downstream end of the catalyst in the exhaust gas flow direction by executing either a downstream end temperature estimation process using the estimated upstream end temperature with a smoothing process for downstream end temperature estimation; and calculates a smoothing coefficient for the estimated downstream end temperature used to smooth the estimated downstream end temperature based on the operation state of the internal combustion engine.

15 Claims, 5 Drawing Sheets

FIG. 4

CATALYST TEMPERATURE ESTIMATING DEVICE AND CATALYST TEMPERATURE ESTIMATING METHOD

CROSS-REFERENCE TO RELATED APPLICATIONS

This application claims priority to Japanese Patent Application No. 2010-088947 filed on Apr. 7, 2010, which is incorporated herein by reference in its entirety including the specification, drawings and abstract.

BACKGROUND OF THE INVENTION

1. Field of the Invention

The invention relates to a catalyst temperature estimating device and a catalyst temperature estimating method.

2. Description of the Related Art

There has been devised a catalyst temperature estimating device that estimates a temperature of a catalyst for purifying exhaust gas of an internal combustion engine. For example, a catalyst temperature estimating device according to Japanese Patent Application Publication No. 2003-343242 (JP-A-2003-343242) calculates a steady estimated temperature as a temperature of a catalyst at a time when an internal combustion engine is in a steady operation state, on the basis of a rotational speed of the internal combustion engine and a load applied to the internal combustion engine. The catalyst temperature estimating device according to Japanese Patent Application Publication No. 2003-343242 (JP-A-2003-343242) estimates the temperature of the catalyst by performing a smoothing processing using this calculated steady estimated temperature and a smoothing coefficient determined by the rotational speed and the load.

However, the catalyst temperature estimating device according to Japanese Patent Application Publication No. 2003-343242 (JP-A-2003-343242), may exhibit a large error between the estimated temperature of the catalyst and the actual temperature of the catalyst when the operation state of the internal combustion engine is an acceleration state. Accordingly, the catalyst temperature estimating device according to Japanese Patent Application Publication No. 2003-343242 (JP-A-2003-343242) does not accurately estimate high catalyst temperatures.

SUMMARY OF THE INVENTION

The invention provides a catalyst temperature estimating device and a catalyst temperature estimating method that accurately estimates the catalyst temperature.

As a first aspect of the invention, catalyst temperature estimating device includes an upstream end temperature estimating portion that estimates a temperature of an upstream end of a catalyst used to purify exhaust gas of an internal combustion engine in an exhaust gas flow direction by executing a smoothing process for upstream end temperature estimation, a downstream end temperature estimating portion that estimates a temperature of a downstream end of the catalyst in the exhaust gas flow direction by executing one of a downstream end temperature estimation process using the estimated upstream end temperature and a smoothing process for downstream end temperature estimation; and a downstream end smoothing coefficient calculating portion that calculates a smoothing coefficient for downstream end temperature estimation that is used in the smoothing process for downstream end temperature estimation based on an operation state of the internal combustion engine.

According to the foregoing aspect of the invention, even in the case where, for example, the temperature behavior of the upstream end temperature of the catalyst is different from the temperature behavior of the downstream end temperature of the catalyst when the operation state of the internal combustion engine is an acceleration state, the upstream end temperature estimating portion and the downstream end temperature estimating portion can estimate the upstream end temperature of the catalyst and the downstream end temperature of the catalyst respectively. Thus, the catalyst temperature can be accurately estimated. Further, in performing the downstream end temperature estimation processing using the upstream end temperature, the downstream end temperature estimating portion can accurately grasp a phenomenon in which the downstream end temperature changes under the influence of the upstream end temperature. Further, in performing the smoothing processing for downstream end temperature estimation, the downstream end temperature estimating portion can accurately estimate the downstream end temperature, because the smoothing coefficient for downstream end temperature estimation is calculated on the basis of the operation state of the internal combustion engine.

In the foregoing aspect of the invention, the downstream end temperature estimating portion may estimate the downstream end temperature by executing the smoothing process for downstream end temperature estimation using the upstream end temperature estimated by the upstream end temperature estimating portion. According to this configuration, in performing the smoothing processing for downstream end temperature estimation, the downstream end temperature estimating portion can accurately grasp a phenomenon in which the downstream end temperature changes under the influence of the upstream end temperature.

In the foregoing aspect of the invention, the downstream end temperature estimating portion may execute the downstream end temperature estimation process using the estimated upstream end temperature if the operation state of the internal combustion engine is an acceleration state, executes the smoothing process for downstream end temperature estimation if the operation state of the internal combustion engine is not the acceleration state, and estimates, as the downstream end temperature, the upstream end temperature estimated by the upstream end temperature estimating portion in the downstream end temperature estimation processing using the upstream end temperature. According to this configuration, the downstream end temperature estimating portion can accurately grasp the phenomenon in which the downstream end temperature changes under the influence of the upstream end temperature when the operation state of the internal combustion engine is the acceleration state.

In the foregoing aspect of the invention, the downstream end temperature estimating portion may execute the downstream end temperature estimation process using the upstream end temperature if the operation state of the internal combustion engine is an acceleration state, executes the smoothing process for downstream end temperature estimation if the operation state of the internal combustion engine is not the acceleration state, and estimates, as the current downstream end temperature, a result obtained by correcting the downstream end temperature estimated last time by the downstream end temperature estimating portion with the upstream end temperature estimated last time by the upstream end temperature estimating portion in the downstream end temperature estimation process using the upstream end temperature In the foregoing aspect of the invention, the downstream end smoothing coefficient calculating portion may calculate, as the smoothing coefficient for downstream end temperature estimation, a smoothing coefficient corresponding to a case where the operation state of the internal combustion engine is an acceleration state or a smoothing coefficient corresponding to a case where the operation state of the internal combustion engine is not the acceleration state, based on the operation state of the internal combustion engine.

According to this configuration, the downstream end temperature estimating portion can accurately estimate the downstream end temperature.

In the foregoing aspect of the invention, the catalyst temperature estimating device may further include an upstream end smoothing coefficient calculating portion that calculates a smoothing coefficient for upstream end temperature estimation based on the operation state of the internal combustion engine. According to this configuration, the upstream end temperature estimating portion can accurately estimate the upstream end temperature.

In the foregoing aspect of the invention, the upstream end smoothing coefficient calculating portion may calculate, as the smoothing coefficient for upstream end temperature estimation, a smoothing coefficient corresponding to a case where the operation state of the internal combustion engine is an acceleration state or a smoothing coefficient corresponding to a case where the operation state of the internal combustion engine is not the acceleration state, based on the operation state of the internal combustion engine.

According to this configuration, the upstream end temperature estimating portion can accurately estimate the upstream end temperature.

As a second aspect of the invention, a catalyst temperature estimating method includes estimating an upstream end temperature of an upstream end of a catalyst that purifies exhaust gas of an internal combustion engine in an exhaust gas flow direction by executing a smoothing process for upstream end temperature estimation; and estimating a downstream end temperature of a downstream end of the catalyst in the exhaust gas flow direction by executing one of a downstream end temperature estimation process that uses the estimated upstream end temperature and a smoothing process for downstream end temperature estimation, or calculating a smoothing coefficient for downstream end temperature estimation used in the smoothing process for downstream end temperature estimation based on an operation state of the internal combustion engine, a catalyst temperature estimating method includes estimating a upstream end temperature as a temperature of an upstream end of a catalyst for purifying exhaust gas of an internal combustion engine in an exhaust gas flow direction by performing a smoothing processing for upstream end temperature estimation, and estimating a downstream end temperature as a temperature of a downstream end of the catalyst in the exhaust gas flow direction by performing one of a downstream end temperature estimation processing using the estimated upstream end temperature and a smoothing processing for downstream end temperature estimation, or calculating a smoothing coefficient for downstream end temperature estimation as a coefficient used in the smoothing processing for downstream end temperature estimation on a basis of an operation state of the internal combustion engine.

In the foregoing aspect of the invention as well, the upstream end temperature of the catalyst and the downstream end temperature of the catalyst can be accurately estimated.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE EMBODIMENTS

Figure 1:
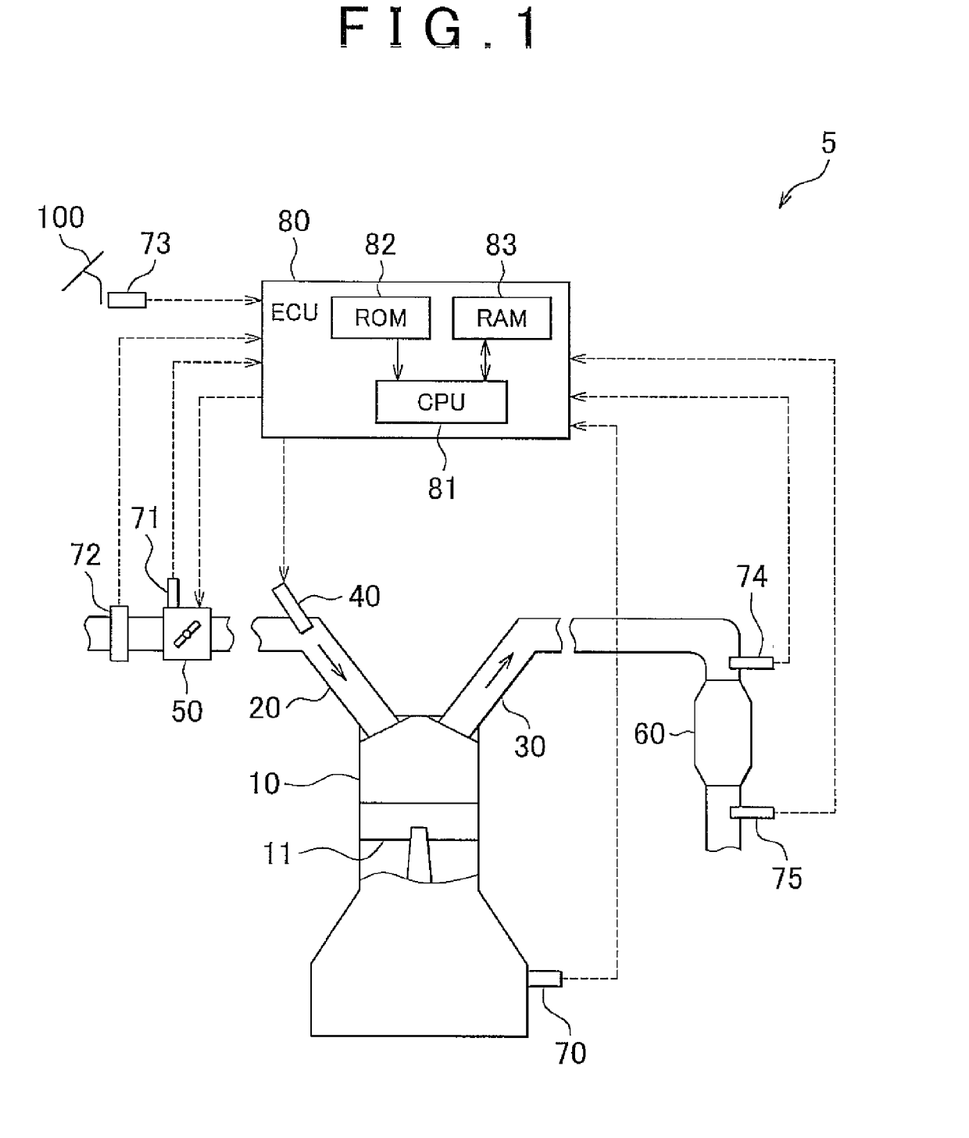
FIG. 1 is a schematic view of the configuration of an internal combustion engine system equipped with an ECU according to a first embodiment of the invention.

An electronic control unit (an ECU) 80 according to the first embodiment of the invention will be described. FIG. 1 is a schematic view of the configuration of an internal combustion engine system 5 equipped with the ECU 80. The internal combustion engine system 5 includes an internal combustion engine 10, an intake passage 20, an exhaust passage 30, an injector 40, a throttle valve 50, a catalyst 60, various detection portions (a crank position sensor 70, a throttle position sensor 71, an airflow meter 72, an accelerator position sensor 73, an air-fuel ratio sensor 74, an oxygen sensor 75, etc.), and the ECU 80.

A piston 11 is housed within each cylinder of the internal combustion engine 10. The piston 11 is connected to a crankshaft via a connecting rod. The crank position sensor 70 is disposed near the crankshaft. Signals from the crank position sensor 70 are transmitted to the ECU 80. The ECU 80 then determines the crank angle of the internal combustion engine 10 and the engine speed, based on the signals output by the crank position sensor 70.

The intake passage 20 is connected to an intake port of the internal combustion engine 10. The exhaust passage 30 is connected to an exhaust port of the internal combustion engine 10. The injector 40 is disposed upstream of the intake passage 20 in an airflow direction. The ECU 80 controls the injection of fuel by the injector 40. The injected fuel is supplied into the cylinder of the internal combustion engine 10 together with air.

A throttle valve 50 that adjusts the amount of the air supplied to the internal combustion engine 10 is disposed in the intake passage 20 upstream of the injector 40 in the airflow direction. The throttle valve 50 is controlled by the ECU 80. The throttle position sensor 71 is disposed near the throttle valve 50. The signals output by the throttle position sensor 71 is transmitted to the ECU 80.

The airflow meter 72 is disposed in the intake passage 20 upstream of the throttle valve 50 in the airflow direction. Signals output by the airflow meter 72 are transmitted to the ECU 80. Further, signals output by the accelerator position sensor 73, which detects the operation amount of an accelerator 100, are transmitted to the ECU 80.

A catalyst 60 for purifying exhaust gas is disposed in the exhaust passage 30 downstream in an exhaust gas flow direction. The catalyst 60 is not limited in particular, but it is possible to employ, for example, a three-way catalyst. The three-way catalyst employed herein is obtained by disposing particulate catalytic components (Pt, Pd, or the like) on a coating that contains an oxygen occluding component such as cerium dioxide, zirconia, or the like.

The air-fuel ratio sensor 74 is disposed in the exhaust passage 30 upstream of the catalyst 60 in the exhaust gas flow direction. The oxygen sensor 75 is disposed in the exhaust passage 30 downstream of the catalyst 60 in the exhaust gas flow direction. Signals output by the air-fuel ratio sensor 74 and the oxygen sensor 75 are transmitted to the ECU 80.

The ECU 80 is a microcomputer that includes with a central processing unit (a CPU) 81, a read only memory (a ROM) 82, and a random access memory (a RAM) 83.

The ECU 80 controls the throttle valve 50 and the injector 40, by causing the CPU 81 to operate while using the RAM 83 in accordance with a program stored in the ROM 82. For example, the ECU 80 controls the throttle valve 50 to an appropriate throttle opening degree, in accordance with the signals output by the crank position sensor 70, the throttle position sensor 71, the airflow meter 72, and the accelerator position sensor 73. Further, the ECU 80 subjects an injection amount of fuel injected from the injector 40 to feedback control, for example, so that the air-fuel ratio (A/F) of exhaust gas becomes stoichiometric, in accordance with signals output by the air-fuel ratio sensor 74 and the oxygen sensor 75.

The ECU 80 also serves as a catalyst temperature estimating device that executes a catalyst temperature estimation process to estimate the temperature of the catalyst 60, by causing the CPU 81 to operate while using the RAM 83 as a temporary storage memory on the basis of a program stored in the ROM 82 and the like.

Figure 2:
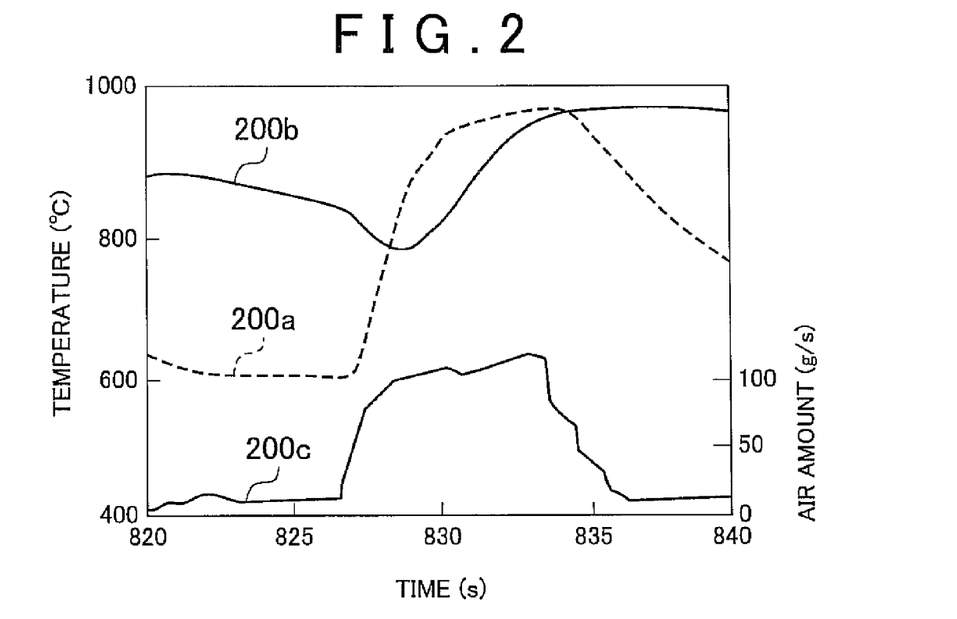
FIG. 2 is graph that depicts the relationship between the temperature of a catalyst and the operation state of an internal combustion engine.

Subsequently, the catalyst temperature estimation process of the ECU 80 will be described. First, the relationship between the temperature of the catalyst 60 and the operation state of the internal combustion engine 10 will be described. FIG. 2 is a graph that depicts the relationship between the temperature of the catalyst 60 and the operation state of the internal combustion engine 10. The abscissa represents time (s), the ordinate on the left side represents the temperature (° C.) of the catalyst 60, and the ordinate on the right side represents the amount (g/s) of air supplied to the internal combustion engine 10 per unit time. The line 200a indicates the measured temperature at an upstream end (hereinafter referred to as "upstream end") of the catalyst 60 in the exhaust gas flow direction, the line 200b indicates the measured temperature at a downstream end (hereinafter referred to as "downstream end") of the catalyst 60 in the exhaust gas flow direction, and the line 200c indicates the measured amount of air supplied to the internal combustion engine 10 per unit time (hereinafter abbreviated as the air amount).

As indicated by the line 200c, the air amount starts increasing in the vicinity of 827 (s). This means that the operation state of the internal combustion engine 10 shifts from a steady state to an acceleration state in the vicinity of 827 (s). Further, the air amount starts decreasing in the vicinity of 833 (s). This means that the operation state of the internal combustion engine 10 shifts to a deceleration state in the vicinity of 833 (s).

As is apparent from line 200a and line 200b, the behavior of the temperature of the upstream end of the catalyst 60 differs from that at the downstream end of the catalyst 60. For example, the temperature of the exhaust gas flowing into the catalyst 60 greatly affects the temperature at the upstream end of the catalyst 60. Thus, the temperature of the upstream end of the catalyst 60 varies in accordance with changes in the air amount.

In contrast, the downstream end of the catalyst 60 is also influenced by the temperature of exhaust gas, but is also influenced by the heat of a chemical reaction from the upstream end of the catalyst 60 to the downstream end of the catalyst 60 and the heat transmitted from the upstream end of the catalyst 60 to the downstream end of the catalyst 60. Thus, in initial stages where the operation state of the internal combustion engine 10 changes to the acceleration state, the temperature of the downstream end starts rising with a delay after the temperature of the upstream end starts rising. Further, in the initial stages where the operation state of the internal combustion engine 10 changes to the acceleration state, the temperature of the downstream end temporarily falls and then starts rising. Further, when the operation state of the internal combustion engine 10 changes to the deceleration state, the rate of temperature decrease at the upstream end is higher than the rate of temperature decrease at the downstream end.

As described above, the temperature behavior at the upstream end of the catalyst 60 differs from the temperature behavior at the downstream end of the catalyst 60. Thus, to accurately estimate the temperature of the catalyst 60, the ECU 80 according to this embodiment of the invention executes a process for estimating the temperature of the upstream end (hereinafter abbreviated as the upstream end temperature in some cases) and a process for estimating the temperature of the downstream end (hereinafter abbreviated as the downstream end temperature in some cases).

In the upstream end temperature estimation process, the ECU 80 estimates the upstream end temperature by executing a smoothing process for upstream end temperature estimation. Specifically, the ECU 80 estimates the upstream end temperature by executing a calculation process based on an expression (1), shown below. That is, the ECU 80 according to this embodiment of the invention functions as a upstream end temperature estimating portion that estimates the upstream end temperature. It should be noted that the smoothing process executed by the upstream end temperature estimation means the calculation process based on expression (1) shown below.

Upstream end temperature=Upstream end temperature estimated last time as result of performance of smoothing processing for upstream end temperature estimation+(Steady-state temperature of catalyst 60−Upstream end temperature estimated last time as result of performance of smoothing processing for upstream end temperature estimation)/(Smoothing coefficient for upstream end temperature estimation)  (1)

That is, the ECU estimates the upstream end temperature by dividing the difference of the previously estimated upstream end temperature and the steady-state temperature of the catalyst by the smoothing coefficient for upstream end temperature estimation calculated by the upstream end temperature estimation smoothing coefficient calculating portion, and then adding the previously estimated upstream end temperature to the resulting quotient.

It should be noted herein that, for example, the coolant temperature of coolant in the internal combustion engine 10, the temperature of intake air in the internal combustion engine 10 may be used as "the previously estimated upstream end temperature as a result of the performance of the smoothing processing for upstream end temperature estimation" in first performing the smoothing processing for upstream end temperature estimation. For example, the ECU 80 may acquire the coolant temperature of the coolant based on the output of a coolant temperature sensor disposed in a water jacket of the internal combustion engine 10. The ECU 80 may acquire the temperature of intake air in the internal combustion engine 10 based on the output of a temperature sensor disposed in the intake passage 20.

Further, a temperature expected to be attained by the catalyst 60 may be used as the steady-state temperature in the expression (1). More specifically, a temperature attained by the upstream end temperature of the catalyst 60 during steady state operation of the internal combustion engine (which is neither an acceleration state nor a deceleration state) for a predetermined period may be used as the steady-state temperature.

The method of calculating the steady-state temperature by the ECU 80 is not limited to a particular method. For example, the ECU 80 may calculate the steady-state temperature based on the operation state of the internal combustion engine 10. In addition, the operation state of the internal combustion engine 10 is not limited in particular. For example, the air amount, the engine speed, the load applied to the internal combustion engine 10, or the like may be used as the operation state of the internal combustion engine 10. In this embodiment of the invention, the air amount is used as the operation state of the internal combustion engine 10. That is, in this embodiment of the invention, the ECU 80 calculates the steady-state temperature based on the air amount.

The specific method of calculating the steady-state temperature by the ECU 80 is not restricted to any particular method. For example, a map showing a relationship between the air amount and the steady-state temperature of the catalyst 60 may be stored in the storage portion of the ECU 80. The ECU 80 can calculate the steady-state temperature of the catalyst 60 by referring to the map stored in the storage portion on the basis of the air amount detected by the airflow meter 72. It should be noted that, for example, a method in which a map is referred to as in the case of calculation based on the air amount can be used as the method in which the ECU 80 calculates the steady-state temperature based on the rotational speed of the internal combustion engine 10, the load applied to the internal combustion engine 10, or the like.

In contrast, in the process for estimating the downstream end temperature (hereinafter referred to as the downstream end temperature estimation processing), the ECU 80 estimates the downstream end temperature by executing a smoothing process for downstream end temperature estimation. In this embodiment of the invention, the ECU 80 estimates the downstream end temperature by performing a smoothing processing for downstream end temperature estimation using the upstream end temperature estimated in the upstream end temperature estimation processing. Specifically, the ECU 80 estimates the downstream end temperature by executing a calculation process based on expression (2), shown below. That is, the ECU 80 according to this embodiment of the invention serves as a downstream end temperature estimating portion that estimates the downstream end temperature by executing the smoothing process for downstream end temperature estimation. It should be noted that the smoothing process for downstream end temperature estimation is the calculation process based on the expression (2).

Downstream end temperature=Downstream end temperature estimated last time as result of performance of smoothing processing for downstream end temperature estimation+(Upstream end temperature estimated as result of performance of upstream end temperature estimation processing−Downstream end temperature estimated last time as result of performance of smoothing processing for downstream end temperature estimation)/(Smoothing coefficient for downstream end temperature estimation) (2)

Accordingly, the ECU estimates the downstream end temperature as a value obtained by dividing the difference of the previously estimated downstream end temperature and the upstream end temperature by the smoothing coefficient for downstream end temperature estimation calculated by the downstream end temperature estimation smoothing coefficient calculating portion, and adding the previously estimated downstream end temperature to the resulting quotient.

It should be noted that, for example, the coolant temperature in the internal combustion engine 10, the temperature of intake, or the like may also be used as "the previously estimated downstream end temperature as a result of executing the smoothing process for downstream end temperature estimation" in first performing the smoothing processing for downstream end temperature.

It should be noted that the upstream end temperature calculated according to the expression (1) varies in accordance with the magnitude of the smoothing coefficient for upstream end temperature estimation. Accordingly, by appropriately selecting the smoothing coefficient for upstream end temperature estimation, the ECU 80 can accurately estimate the temperature behavior of the upstream end temperature. Further, the downstream end temperature calculated according to the expression (2) changes in accordance with the magnitude of the smoothing coefficient for downstream end temperature estimation. Therefore, by appropriately selecting the smoothing coefficient for downstream end temperature estimation, the ECU 80 can accurately estimate the temperature behavior of the downstream end temperature.

Thus, in this embodiment of the invention, the ECU 80 calculates the smoothing coefficient for upstream end temperature estimation in the expression (1) based on the operation state of the internal combustion engine 10. Further, the ECU 80 calculates the smoothing coefficient for downstream end temperature estimation in the expression (2) based on the operation state of the internal combustion engine 10. That is, the ECU 80 according to this embodiment of the invention has a serves as a upstream end smoothing coefficient calculating portion that calculates a smoothing coefficient for upstream end temperature estimation, and a also serves as a downstream end smoothing coefficient calculating portion that calculates a smoothing coefficient for downstream end temperature estimation.

The indicator of the operation state of the internal combustion engine 10 is not restricted to any particular indicator, but the air amount, the rotational speed of the internal combustion engine 10, the load applied to the internal combustion engine 10, or the like may be used as the indicator of the operation state of the internal combustion engine 10. In this embodiment of the invention, the air amount is used as the indicator of the operation state of the internal combustion engine 10. Accordingly, in this embodiment of the invention, the ECU 80 calculates the smoothing coefficient for upstream end temperature estimation and the smoothing coefficient for downstream end temperature estimation based on the air amount.

The specific method used by the ECU 80 to calculate the smoothing coefficient for upstream end temperature estimation and the smoothing coefficient for downstream end temperature estimation is not restricted to any method in particular. For example, a map showing a relationship between the air amount and the smoothing coefficient for upstream end temperature estimation and a map showing a relationship between the air amount and the smoothing coefficient for downstream end temperature estimation are stored in storage portion of the ECU 80. The ECU 80 sets the smoothing coefficient for upstream end temperature estimation and the smoothing coefficient for downstream end temperature estimation based on the air amount detected by the airflow meter 72 by referring to maps stored in the storage portion of the ECU 80. It should be noted that, for example, a method in which a map is referred to as in the case of calculation based on the air amount can be used as the method in which the ECU 80 calculates the smoothing coefficient for upstream end temperature estimation and the smoothing coefficient for downstream end temperature estimation based on the engine speed, the load applied to the internal combustion engine 10, or the like.

Figure 3:
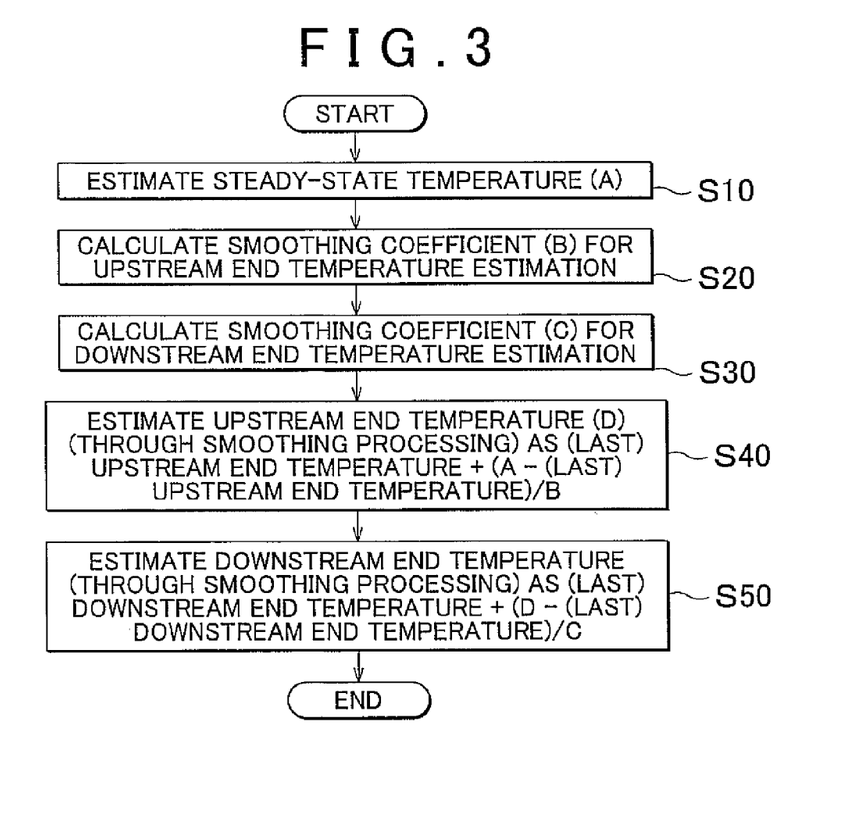
FIG. 3 is an example of a flowchart of a catalyst temperature estimation process executed by the ECU according to the first embodiment of the invention.

FIG. 3 is a flowchart of the catalyst temperature estimation process executed by the ECU 80. The ECU 80 executes the program of the flowchart of FIG. 3 at predetermined intervals. First, the ECU 80 estimates the steady-state temperature (A) of the catalyst 60 based on an operation state of the internal combustion engine 10 (step S10). For example, the ECU 80 estimates the steady-state temperature of the catalyst 60 based on the air amount.

The ECU 80 then calculates the smoothing coefficient (B) for upstream end temperature estimation (step S20). Specifically, the ECU 80 calculates the smoothing coefficient for upstream end temperature estimation based on an operation state of the internal combustion engine 10. For example, the ECU 80 calculates the smoothing coefficient for upstream end temperature estimation based on an air amount.

Next, the ECU 80 calculates the smoothing coefficient (C) for downstream end temperature estimation (step S30). Specifically, the ECU 80 calculates the smoothing coefficient for downstream end temperature estimation based on an operation state of the internal combustion engine 10. For example, the ECU 80 may calculate the smoothing coefficient for downstream end temperature estimation based on an air amount.

The ECU 80 then estimates an upstream end temperature (D) of the catalyst 60 by executing the smoothing process for upstream end temperature estimation (step S40). Specifically, the ECU 80 estimates the upstream end temperature (D) by executing the calculation process based on the expression (1).

The ECU 80 then estimates the downstream end temperature of the catalyst 60 by executing the smoothing process for downstream end temperature estimation (step S50). Specifically, the ECU 80 estimates the downstream end temperature by executing the calculation processing based on the expression (2). The ECU 80 then terminates execution of the program.

As described above, the ECU 80 according to the first embodiment of the invention estimates the upstream end temperature of the catalyst 60 and the downstream end temperature of the catalyst 60 by executing the upstream end temperature estimation process and the downstream end temperature estimation process, respectively. Thus, even if the temperature behavior of the upstream end of the catalyst 60 differs from the temperature behavior of the downstream end of the catalyst 60, the ECU 80 can accurately estimate the temperature of the catalyst 60. As a result, according to the ECU 80, the deviation of the estimated temperature of the catalyst 60 from the actual temperature of the catalyst 60 is minimized even when the internal combustion engine 10 repeats acceleration and deceleration.

Further, the ECU 80 calculates the smoothing coefficient for upstream end temperature estimation and the smoothing coefficient for downstream end temperature estimation based on the operation state of the internal combustion engine 10. Thus, the ECU 80 more accurately estimates the upstream end temperature and the downstream end temperature.

Further, the ECU 80 estimates the downstream end temperature by executing the smoothing process for downstream end temperature estimation using the upstream end temperature estimated in the upstream end temperature estimation processing. Thus, the ECU 80 can accurately grasp a phenomenon in which the downstream end temperature changes under the influence of the upstream end temperature. For example, the ECU 80 can accurately grasp a phenomenon in which the downstream end temperature temporarily decreases under the influence of the upstream end temperature in the initial stages of acceleration of the internal combustion engine 10. Accordingly, the ECU 80 accurately estimates the temperature of the catalyst 60.

Next, the ECU 80 according to the second embodiment of the invention will be described. The ECU 80 according to the second embodiment of the invention differs from the ECU 80 according to the first embodiment of the invention with respect to the subprocesses of the catalyst temperature estimation process. In the second embodiment of the invention, the ECU 80 determines whether to subject the downstream end temperature to the downstream end temperature estimation processing using the upstream end temperature estimated by the upstream end temperature estimating portion based on the operation state of the internal combustion engine, or the smoothing processing for downstream end temperature estimation. Specifically, the ECU 80 according to this embodiment of the invention changes the sub-processes for estimating the downstream end temperature depending on whether the operation state of the internal combustion engine 10 is an acceleration state. More specifically, if the operation state of the internal combustion engine 10 is the acceleration state, the ECU 80 executes the downstream end temperature estimation process using the upstream end temperature. However, if the operation state of the internal combustion engine 10 is not the acceleration state, the ECU 80 executes a smoothing process for downstream end temperature estimation that differs from that of the first embodiment of the invention. That is, the ECU 80 according to this embodiment of the invention serves as a downstream end temperature estimating portion that estimates the downstream end temperature by executing one of the downstream end temperature estimation process using the upstream end temperature and the smoothing process for downstream end temperature estimation.

In the downstream end temperature estimation process using the upstream end temperature (hereinafter referred to as an acceleration downstream end temperature estimation process), which is executed when the operation state of the internal combustion engine 10 is the acceleration state, the ECU 80 estimates, as the downstream end temperature, the upstream end temperature estimated in the upstream end temperature estimation processing.

The smoothing process for downstream end temperature estimation that is executed when the operation state of the internal combustion engine 10 is not the acceleration state differs from the smoothing process for downstream end temperature estimation according to the first embodiment of the invention in that the steady-state temperature of the catalyst 60 is used instead of the upstream end temperature. Specifically, the smoothing process for downstream end temperature estimation according to this embodiment of the invention is executed based on an expression (3) shown below.

Downstream end temperature=Downstream end temperature estimated last time as result of performance of smoothing processing for downstream end temperature estimation+(Steady-state temperature of catalyst 60−Downstream end temperature estimated last time as result of performance of smoothing processing for downstream end temperature estimation)/(Smoothing coefficient for downstream end temperature estimation)      (3)

Figure 4:
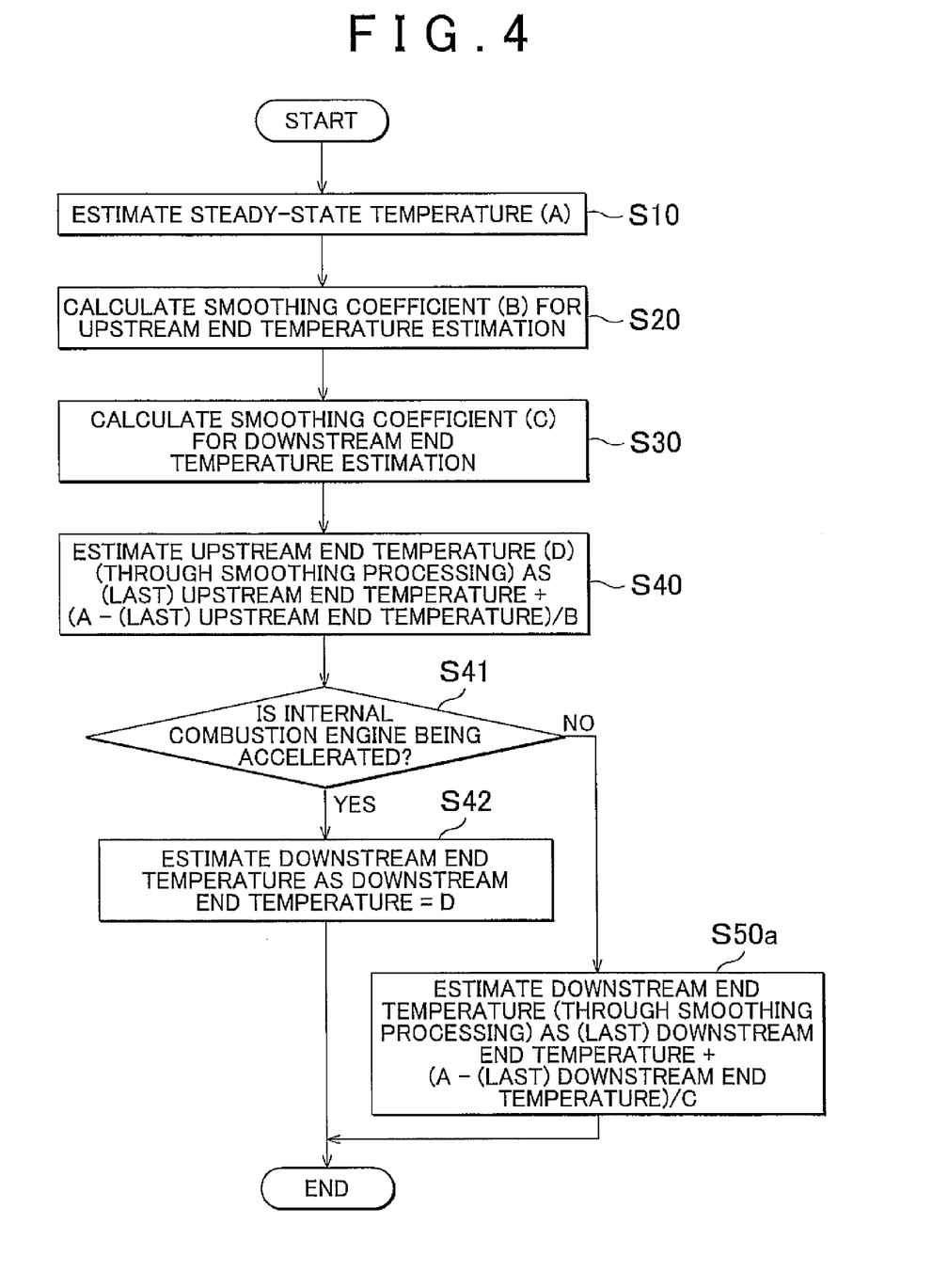
FIG. 4 is an example of a flowchart of a catalyst temperature estimation process executed by an ECU according to a second embodiment of the invention.

FIG. 4 is shows an example of a flowchart of a catalyst temperature estimation process executed by the ECU 80 according to this embodiment of the invention. The ECU 80 according to this embodiment of the invention executes the program of the flowchart of FIG. 4 at predetermined intervals. The flowchart of FIG. 4 differs from the flowchart of FIG. 3 in that step S41, step S42, and step 50a are provided instead of step S50. The configuration is otherwise identical to that of the flowchart of FIG. 3, and the identical features will not be described below.

Step S41 is executed after step S40. In step S41, the ECU 80 determines whether the operation state of the internal combustion engine 10 is the acceleration state. The method of making the determination in step S41 is not limited to any particular method. For example, the ECU 80 determines whether the operation state of the internal combustion engine 10 is the acceleration state based on whether rate of increase in the air amount exceeds a threshold rate. If the rate of increase in the air amount is exceeds the threshold rate, the ECU 80 determines that the internal combustion engine 10 is in the acceleration state. If the rate of increase in the air amount is equal to or below the threshold rate, the ECU 80 determines that the internal combustion engine 10 is not in the acceleration state. Alternatively, the ECU 80 may determine whether the internal combustion engine 10 is in the acceleration state based on the rate of change in the rotational speed of the internal combustion engine 10, the rate of change in vehicle speed, or the like.

If it is determined in step S41 that the operation state of the internal combustion engine 10 is the acceleration state, the ECU 80 executes the acceleration downstream end temperature estimation process (step S42). Specifically, in step S42, the ECU 80 estimates, as the downstream end temperature, the upstream end temperature (D) estimated in step S40. The ECU 80 then terminates execution of the program.

If it is determined in step S41 that the operation state of the internal combustion engine 10 is the acceleration state, the ECU 80 estimates the downstream end temperature by executing the smoothing process for downstream end temperature estimation (step S50a). Specifically, in step S50a, the ECU 80 estimates the downstream end temperature by executing the calculation process based on the expression (3). The ECU 80 then terminates execution of the program.

It should be noted that the steady-state temperature (A) used in the smoothing processing for downstream end temperature estimation in step S50a may be equal to or different from the steady-state temperature (A) used in the smoothing processing for upstream end temperature estimation in step S40. If the steady-state temperature used in step S50a differs from the steady-state temperature used in step S40, the ECU 80 estimates, for example, the steady-state temperature of the upstream end of the catalyst 60 and the steady-state temperature of the downstream end of the catalyst 60 respectively in step S10. In step S40, the ECU 80 then executes the smoothing process based on the expression (1), using the steady-state temperature of the upstream end estimated in step S10. Further, in step S50a, the ECU 80 executes the smoothing processing based on the expression (3) using the steady-state temperature of the downstream end estimated in step S10.

The ECU 80 according to the second embodiment of the invention estimates the upstream end temperature of the catalyst 60 and the downstream end temperature of the catalyst 60 by executing both the upstream end temperature estimation process (step S40) and the downstream end temperature estimation process (step S42 and step S50a). Thus, the temperature of the catalyst 60 can be accurately estimated. Further, as in the case of the first embodiment of the invention, the ECU 80 according to the second embodiment of the invention calculates the smoothing coefficient for upstream end temperature estimation and downstream end temperature estimation based on the operation state of the internal combustion engine 10. Thus, the temperature of the catalyst 60 may be more accurately estimated.

Further, the ECU 80 according to this embodiment of the invention estimates, as the downstream end temperature, the upstream end temperature estimated in the upstream end temperature estimation processing in the acceleration downstream end temperature estimation process (step S42). Thus, the ECU 80 can accurately grasp a phenomenon in which the downstream end temperature changes under the influence of the upstream end temperature. For example, the ECU 80 can accurately grasp a phenomenon in which the downstream end temperature temporarily falls under the influence of the upstream end temperature in the initial stages of acceleration of the internal combustion engine 10. Accordingly, the ECU 80 accurately estimates the temperature of the catalyst 60.

Further, the ECU 80 according to this embodiment of the invention estimates the downstream end temperature without using the upstream end temperature in the smoothing processing for downstream end temperature estimation, which is executed when the internal combustion engine 10 is not in the acceleration state (step S50a). Thus, according to the ECU 80, when the internal combustion engine 10 is not in the acceleration state, the estimated downstream end temperature can be restrained from being influenced by the accuracy in estimating the upstream end temperature.

Next, the ECU 80 according to the third embodiment of the invention will be described. The ECU 80 according to this embodiment of the invention differs from the ECU 80 according to the second embodiment of the invention with respect to the sub-processes of the catalyst temperature estimation process. Specifically, the sub-processes of the acceleration downstream end temperature estimation process executed by the ECU 80 according to this embodiment of the invention differs from those executed by the ECU 80 according to the second embodiment of the invention. More specifically, the ECU 80 according to this embodiment of the invention estimates, as a current downstream end temperature, a result obtained by correcting a downstream end temperature estimated last time through the downstream end temperature estimation processing with a upstream end temperature estimated last time through the upstream end temperature estimation processing, in the acceleration downstream end temperature estimation processing. The configuration is otherwise identical to those of the ECU 80 according to the second embodiment of the invention, and the identical features will not be described below.

Figure 5:
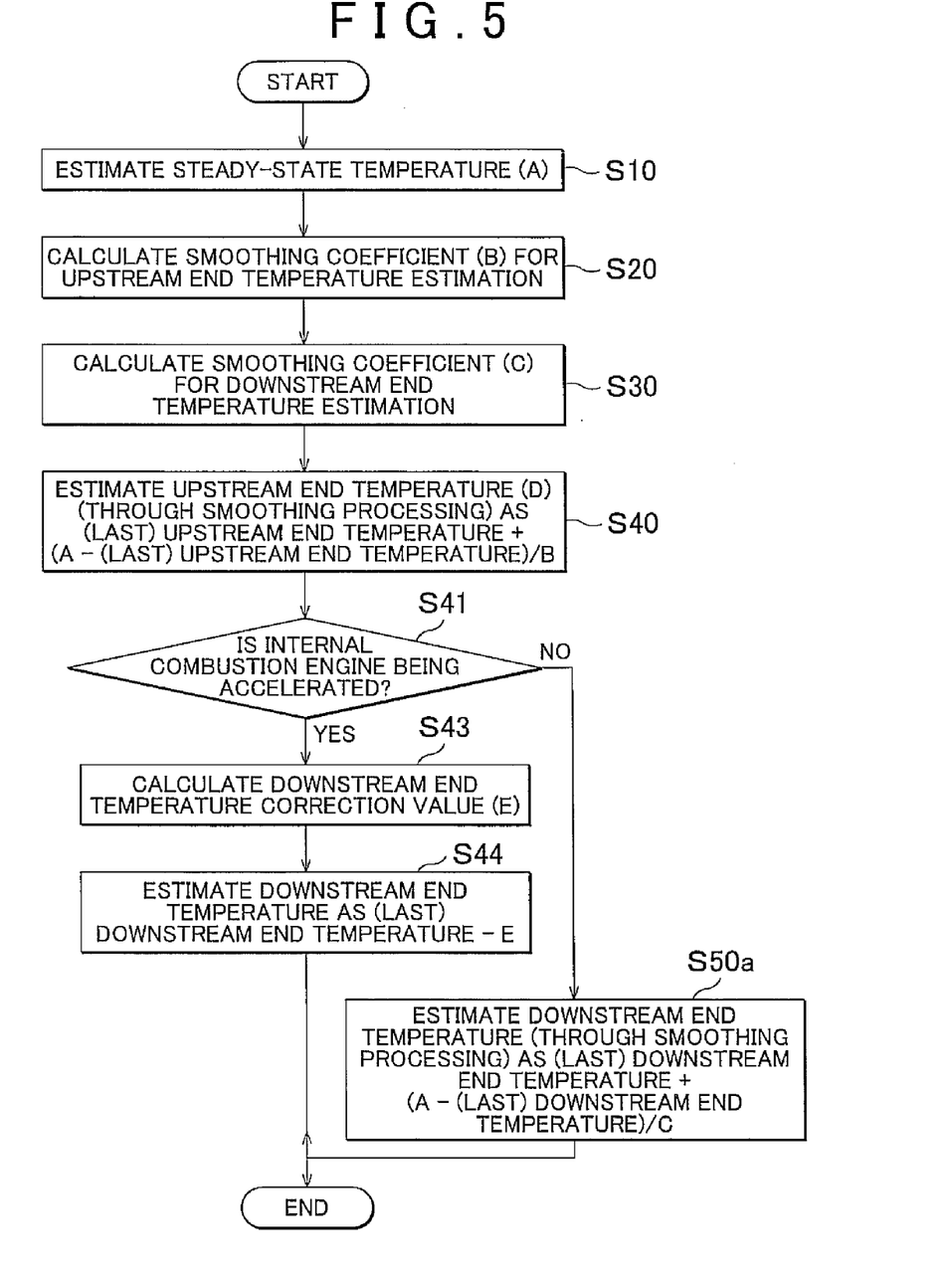
FIG. 5 is an example of a flowchart of a catalyst temperature estimation process executed by an ECU according to a third embodiment of the invention.

FIG. 5 is a view showing an example of a flowchart of a catalyst temperature estimation process executed by the ECU 80 according to the second embodiment of the invention. The ECU 80 executes the program of the flowchart of FIG. 5 at predetermined intervals. The flowchart of FIG. 5 differs from the flowchart of FIG. 4 in that step S43 and step S44 are provided instead of step S42. Step S43 and step S44 correspond to the acceleration downstream end temperature estimation processing according to the second embodiment of the invention. The configuration is otherwise identical to those of the flowchart of FIG. 4, and the identical features will not be described below.

Step S43 is executed out if it is determined in step S41 that the operation state of the internal combustion engine 10 is the acceleration state. In step S43, the ECU 80 calculates a downstream end temperature correction value (E). Specifically, the ECU 80 calculates the downstream end temperature correction value (E) based on a downstream end temperature estimated in step S44 or step S50a and the upstream end temperature (D) estimated in step S40 in the preceding execution of the program.

More specifically, if step S44 was executed during the preceding execution of the program, the ECU 80 calculates the downstream end temperature correction value (E) based on the difference between the downstream end temperature estimated previously in step S44 and the upstream end temperature (D) estimated previously in step S40. For example, the ECU 80 sets, as the downstream end temperature correction value (E), the value obtained by multiplying the difference between the downstream end temperature estimated previously in step S44 and the upstream end temperature (D) estimated previously in step S40 by a predetermined coefficient.

Further, if step S50a was executed during the preceding execution of the program of, the ECU 80 calculates the downstream end temperature correction value (E) based on the difference between the downstream end temperature estimated in the previous execution of step S50a and the upstream end temperature (D) estimated in the previous execution of step S40. For example, the ECU 80 acquires, as the downstream end temperature correction value (E), a value obtained by multiplying the difference between the downstream end temperature estimated last time in step S50a and the upstream end temperature (D) estimated last time in step S40 by the predetermined coefficient.

After executing step S43, the ECU 80 executes step S44. In step S44, the ECU 80 corrects the previously estimated downstream end temperature by executing step S44 or step S50a, using the downstream end temperature correction value (E) calculated in step S43, and estimates the corrected result as the current downstream end temperature.

Specifically, when step S44 is carried out during the last execution of the program of the flowchart, the ECU 80 sets the difference between the downstream end current temperature correction value (E), calculated in the current execution of step S43, and the previously estimated downstream end temperature, estimated during the preceding execution of step S44, as the current downstream end temperature. Further, when step S50a is carried out during the last execution of the program of the flowchart, the ECU 80 sets the difference between the downstream end temperature correction value (E), calculated in the current execution of step S43, and the downstream end temperature, estimated in the previous execution of step S50a, as the current downstream end temperature. The ECU 80 then terminates the execution of the program of the flowchart.

The ECU 80 according to this embodiment of the invention estimates the upstream end temperature of the catalyst 60 and the downstream end temperature of the catalyst 60 by executing the upstream end temperature estimation process (step S40) and the downstream end temperature estimation process (step S43, step S44, and step S50a) respectively. Thus, the ECU 80 can accurately estimate the temperature of the catalyst 60. Further, the ECU 80 according to this embodiment of the invention calculates the smoothing coefficient for upstream end temperature estimation and the smoothing coefficient for downstream end temperature estimation based on the operation state of the internal combustion engine 10, and hence, like the first embodiment of the invention and the second embodiment of the invention, can more accurately estimate the temperature of the catalyst 60.

Further, in the acceleration downstream end temperature estimation process (step S43 and step S44), the ECU 80 according to this embodiment of the invention sets the result obtained by correcting the downstream end temperature estimated last time through the downstream end temperature estimation process with the upstream end temperature estimated last time through the upstream end temperature estimation process as the current downstream end temperature. Thus, the ECU 80 can accurately grasp a phenomenon in which the downstream end temperature changes under the influence of the upstream end temperature. For example, the ECU 80 can accurately grasp a phenomenon in which the downstream end temperature temporarily falls under the influence of the upstream end temperature in the initial stages of acceleration of the internal combustion engine 10. Accordingly, the ECU 80 can accurately estimate the temperature of the catalyst 60.

Next, the ECU 80 according to the fourth embodiment of the invention will be described. The ECU 80 according to this embodiment of the invention differs the ECU 80 according to any one of the first to third embodiments of the invention with respect to the sub-processes of the catalyst temperature estimation process. Specifically, the ECU 80 according to this embodiment of the invention differs from the ECU 80 according to any one of the first to third embodiments of the invention with respect to the sub-processes of the upstream end temperature estimation smoothing coefficient calculation process and the downstream end temperature estimation smoothing coefficient calculation process.

More specifically, the ECU 80 according to this embodiment of the invention calculates, as a smoothing coefficient for upstream end temperature estimation, a smoothing coefficient for when the operation state of the internal combustion engine 10 is accelerating or a smoothing coefficient when the operation state of the internal combustion engine 10 is not accelerating, based on the operation state of the internal combustion engine 10. Furthermore, the ECU 80 calculates, as a smoothing coefficient for downstream end temperature estimation, a smoothing coefficient when the internal combustion engine 10 is accelerating or a smoothing coefficient when the internal combustion engine 10 is not accelerating, based on the operation state of the internal combustion engine 10. The configuration is otherwise identical to those of the ECU 80 according to any one of the first to third embodiments of the invention, and the identical features will not be described below.

Figure 6:
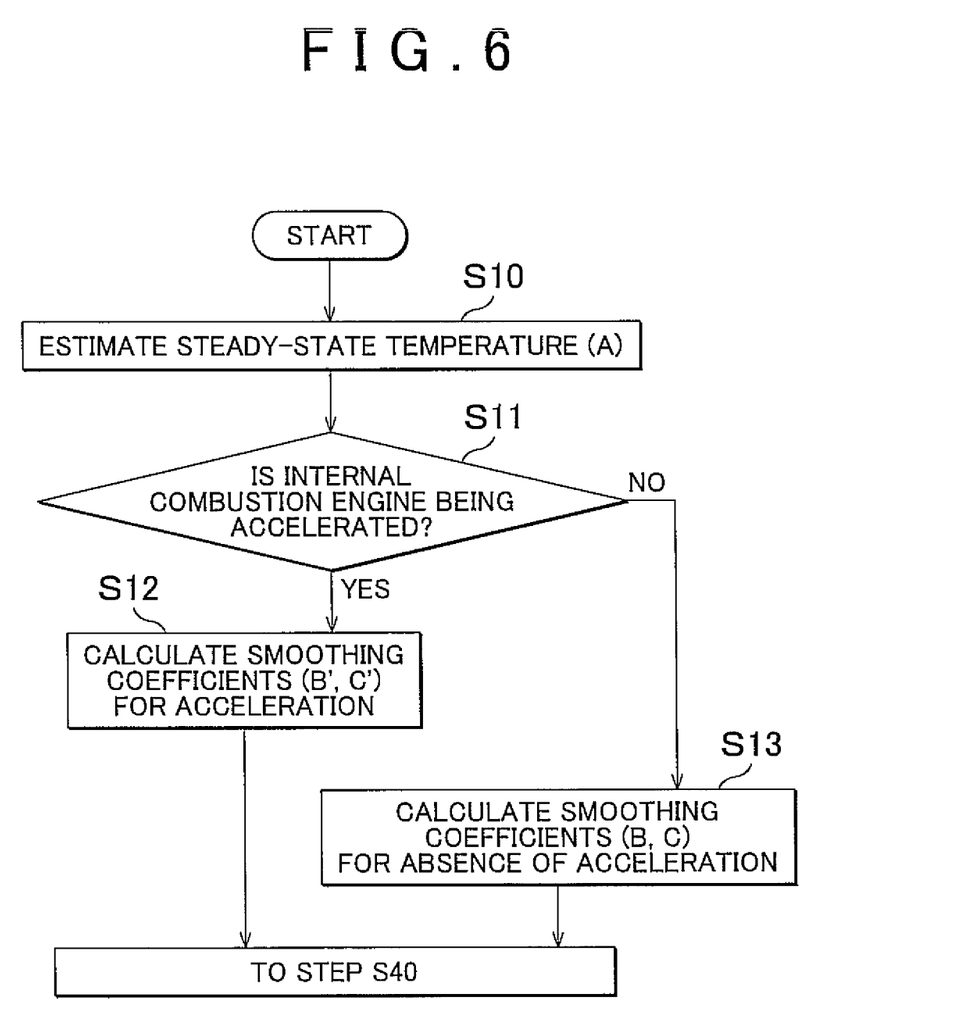
FIG. 6 is an example of a flowchart of a catalyst temperature estimation process executed by an ECU according to a fourth embodiment of the invention.

FIG. 6 is shows an example of a flowchart of the catalyst temperature estimation process executed by the ECU 80 according to this embodiment of the invention. In particular the ECU 80 executes the program of the flowchart of FIG. 6 at predetermined intervals. The flowchart of FIG. 6 differs from the flowcharts of FIGS. 3, 4, and 5 in that step S11, step S12 and step S13 are carried out instead of step S20 and step S30. The configuration is otherwise identical to those of the flowcharts of FIGS. 3, 4, and 5, and the identical features will not be described below.

Step S11 is executed after step S10. In step S11, the ECU 80 determines whether the operation state of the internal combustion engine 10 is the acceleration state. The method of determining whether the operation state of the internal combustion engine 10 is the acceleration state is not limited in particular. For example, if the steady-state temperature (A)

calculated in step S10 exceeds a threshold temperature, the ECU 80 determines that the operation state of the internal combustion engine 10 is the acceleration state. If the steady-state temperature (A) is equal to or below the threshold temperature, the ECU 80 determines that the operation state of the internal combustion engine 10 is not the acceleration state. Alternatively, the ECU 80 may determine whether the operation state of the internal combustion engine 10 is the acceleration state, based on the rate of change in engine speed, the rate of change in the vehicle speed of the vehicle, or the like.

If it is determined in step S11 that the operation state of the internal combustion engine 10 is the acceleration state, the ECU 80 calculates a upstream end temperature estimation smoothing coefficient (B') for acceleration and a downstream end temperature estimation smoothing coefficient (C') for acceleration based on an indicator of the operation state of the internal combustion engine 10 (step S12). The indicator of the operation state of the internal combustion engine 10 is not restricted to a particular indicator the air amount, the rotational speed of the internal combustion engine 10, the load applied to the internal combustion engine 10, or the like is used as the operation state of the internal combustion engine 10. In this embodiment of the invention, the air amount is used as the indicator of the operation state of the internal combustion engine 10. That is, the ECU 80 calculates both the upstream end temperature estimation smoothing coefficient (B') and the downstream end temperature estimation smoothing coefficient (C') for acceleration based on the air amount.

For example, maps that show the relationship between the air amount and the upstream end temperature estimation smoothing coefficient (B') for acceleration and the relationship between the air amount and the downstream end temperature estimation smoothing coefficient (C') for acceleration are stored in the storage portion of the ECU 80. Accordingly, the ECU 80 refers to the maps stored in the storage portion to determine the upstream end temperature estimation smoothing coefficient (B') and the downstream end temperature estimation smoothing coefficient (C') for acceleration based on the air amount detected by the airflow meter 72. It should be noted that the smoothing coefficients (B', C') may also be determined on the basis of the engine speed, the load applied to the internal combustion engine 10, or the like, by referring to an appropriate map, in a manner similar to that for determining smoothing coefficients (B', C') based on the air amount" would be clearer.

If it is determined in step S11 that the operation state of the internal combustion engine 10 is not the acceleration state, the ECU 80 calculates the upstream end temperature estimation smoothing coefficient (B) and the downstream end temperature estimation smoothing coefficient (C) for the case where the operation state of the internal combustion engine 10 is not the acceleration state, based on the operation state of the internal combustion engine 10 (step S13). The operation state of the internal combustion engine 10 is not restricted to a particular indicator the air amount, the rotational speed of the internal combustion engine 10, the load applied to the internal combustion engine 10, or the like is used as the operation state of the internal combustion engine 10. In this embodiment of the invention, the air amount is used as the operation state of the internal combustion engine 10. That is, the ECU 80 calculates the upstream end temperature estimation smoothing coefficient (B) for when the internal combustion engine 10 is not the acceleration state and the downstream end temperature estimation smoothing coefficient (C) for when the internal combustion engine 10 is not the acceleration state, based on the air amount.

For example, a map showing a relationship between the air amount and the upstream end temperature estimation smoothing coefficient (B) and a map showing a relationship between the air amount and the downstream end temperature estimation smoothing coefficient (C) for when the internal combustion engine 10 is not the acceleration state is stored in the storage portion of the ECU 80. The ECU 80 refers to the maps stored in the storage portion to set the upstream end temperature estimation smoothing coefficient (B) and the downstream end temperature estimation smoothing coefficient (C) for when the internal combustion engine 10 is not accelerating, based on the air amount detected by the airflow meter 72. It should be noted that the smoothing coefficients (B, C) may also be determined on the basis of the engine speed, the load applied to the internal combustion engine 10, or the like, by referring to an appropriate map, in a manner similar to that for determining smoothing coefficients (B, C) based on the air amount.

After step S12, the ECU 80 executes the steps from step S40 in FIGS. 3, 4, and 5 using the upstream end temperature estimation smoothing coefficient (B') for acceleration and the downstream end temperature estimation smoothing coefficient (C') for acceleration. After step S13, the ECU 80 executes the steps starting from step S40 in FIGS. 3, 4, and 5 using the upstream end temperature estimation smoothing coefficient (B) for the case where the operation state of the internal combustion engine 10 is not the acceleration state and the downstream end temperature estimation smoothing coefficient (C) for the case where the operation state of the internal combustion engine 10 is not the acceleration state.

The ECU 80 according to this embodiment of the invention executes the steps starting from step S40 in FIGS. 3, 4, and 5. Therefore, an effect similar to those of the first to third embodiments of the invention is achieved.

Further, the ECU 80 according to this embodiment of the invention calculates, as each of the smoothing coefficient for upstream end temperature estimation and the smoothing coefficient for downstream end temperature estimation, the smoothing coefficient when the operation state of the internal combustion engine 10 is the acceleration state or the smoothing coefficient when the operation state of the internal combustion engine 10 is not the acceleration state. Thus, the ECU 80 can accurately estimate the upstream end temperature and the downstream end temperature. Accordingly, it is possible for the ECU 80 to accurately estimate the temperature of the catalyst 60.

Although the example embodiments of the invention have been described in detail above, the invention is not limited to the described embodiments. Various modifications and changes are possible within the scope of the invention as set forth in the claims.

What is claimed is:
1. A controller comprising:
an airflow sensor disposed in an intake passage of an internal combustion engine, the airflow sensor measures an amount of air supplied to the internal combustion engine; and
an electronic control unit operatively connected to the internal combustion engine connected to the airflow sensor, the electronic control unit configured to:
determine an operating state of the internal combustion engine based on the measured amount of air supplied to the internal combustion engine detected by the airflow sensor;
estimate a temperature of an upstream end of a catalyst used to purify exhaust gas of the internal combustion engine in an exhaust gas flow direction by executing a smoothing process for upstream end temperature estimation;

calculating a smoothing coefficient for downstream end temperature estimation that is used in the smoothing process for downstream end temperature estimation based on the operation state of the internal combustion engine; and estimate a temperature of a downstream end of the catalyst in the exhaust gas flow direction, after estimating the upstream end temperature and calculating the downstream smoothing coefficient, by executing a smoothing process for downstream end temperature estimation using the estimated upstream end temperature, the controller is configured to operate the internal combustion engine in response to the estimated temperature of the upstream end of the catalyst and the estimated temperature of the downstream end of the catalyst.

2. The controller according to claim 1, wherein the electronic control unit executes the downstream end temperature estimation process using the estimated upstream end temperature when the operation state of the internal combustion engine is an acceleration state, and the electronic control unit executes the smoothing process for downstream end temperature estimation when the operation state of the internal combustion engine is not the acceleration state, and the electronic control unit estimates, as the downstream end temperature, the estimated upstream end temperature in the downstream end temperature estimation processing using the upstream end temperature.

3. The controller according to claim 1, wherein the electronic control unit executes the downstream end temperature estimation process using the upstream end temperature when the operation state of the internal combustion engine is an acceleration state, the electronic control unit executes the smoothing process for downstream end temperature estimation when the operation state of the internal combustion engine is not the acceleration state, and the electronic control unit estimates, as the current downstream end temperature, a result obtained by correcting the downstream end temperature estimated last time by the electronic control unit with the upstream end temperature estimated last time by the electronic control unit in the downstream end temperature estimation process using the upstream end temperature.

4. The controller according to claim 1, wherein the electronic control unit calculates, as the smoothing coefficient for downstream end temperature estimation, a smoothing coefficient corresponding to a case where the operation state of the internal combustion engine is an acceleration state or a smoothing coefficient corresponding to a case where the operation state of the internal combustion engine is not the acceleration state, based on the operation state of the internal combustion engine.

5. The controller according to claim 1, wherein the electronic control unit estimates, as the downstream end temperature by dividing a difference between the previously estimated downstream end temperature and the estimated upstream end temperature by the smoothing coefficient for downstream end temperature estimation, and then adding the previously estimated downstream end temperature to the resulting quotient.

6. The controller according to claim 1, wherein the electronic control unit calculates a smoothing coefficient for upstream end temperature estimation based on the operation state of the internal combustion engine.

7. The controller according to claim 6, wherein the electronic control unit calculates, as the smoothing coefficient for upstream end temperature estimation, a smoothing coefficient corresponding to a case where the operation state of the internal combustion engine is an acceleration state or a smoothing coefficient corresponding to a case where the operation state of the internal combustion engine is not the acceleration state, based on the operation state of the internal combustion engine.

8. The controller according to claim 6, wherein the smoothing processing for upstream end temperature estimation is designed to estimate the upstream end temperature, by dividing a difference between the previously estimated upstream end and a steady-state temperature of the catalyst by the smoothing coefficient for upstream end temperature estimation, and then adding the previously estimated upstream end temperature to the resulting quotient.

9. A control method comprising:
providing an electronic control unit operatively connected to an internal combustion engine and an airflow sensor disposed in an intake passage of the internal combustion engine;

measuring an amount of air supplied to the internal combustion engine, by the airflow sensor disposed in the intake passage of the internal combustion engine;

determining, by the electronic control unit, an operating state of the internal combustion engine based on the measured amount of air supplied to the internal combustion engine detected by the airflow sensor;

estimating, by the electronic control unit, an upstream end temperature of an upstream end of a catalyst that purifies exhaust gas of the internal combustion engine in the exhaust gas flow direction by executing a smoothing process for upstream end temperature estimation;

calculating a smoothing coefficient for downstream end temperature estimation based on the operation state of the internal combustion engine;

estimating, by the electronic control unit, a downstream end temperature of a downstream end of the catalyst in the exhaust gas flow direction, after estimating the upstream end temperature and calculating the smoothing coefficient, by executing a smoothing process for downstream end temperature estimation using the estimated upstream end temperature and the smoothing coefficient; and operate the internal combustion engine in response to the estimated temperature of the upstream end of the catalyst and the estimated temperature of the downstream end of the catalyst.

10. The control method according to claim 9, wherein the downstream end temperature estimation process using the upstream end temperature is executed, by the electronic control unit, when the operation state of the internal combustion engine is an acceleration state, the smoothing process for downstream end temperature estimation is executed, by the electronic control unit, when the operation state of the internal combustion engine is not the acceleration state, and the estimated upstream end temperature is estimated as the downstream end temperature in the downstream end temperature estimation processing using the upstream end temperature.

11. The control method according to claim 9, wherein the downstream end temperature estimation process using the upstream end temperature is executed, by the electronic control unit, when the operation state of the internal combustion engine is an acceleration state, the smoothing process for downstream end temperature estimation is executed, by the electronic control unit, when the operation state of the internal combustion engine is not the acceleration state, and a result obtained by correcting the downstream end temperature estimated last time with the upstream end temperature estimated last time is estimated as the current downstream end temperature in the downstream end temperature estimation processing using the upstream end temperature.

12. The control method according to claim 9, wherein the smoothing coefficient for downstream end temperature estimation is calculated, by the electronic control unit, as a smoothing coefficient corresponding to a case where the operation state of the internal combustion engine is an acceleration state or a smoothing coefficient corresponding to a case where the operation state of the internal combustion engine is not the acceleration state, based on the operation state of the internal combustion engine.

13. The control method according to claim 9, wherein the downstream end temperature is estimated, by the electronic control unit, by dividing a difference between the previously estimated downstream end temperature and the estimated upstream end temperature by the calculated smoothing coefficient for downstream end temperature estimation, and then adding the previously estimated downstream end temperature to the resulting quotient.

14. The control method according to claim 9, further comprising calculating, by the electronic control unit, a smoothing coefficient for upstream end temperature estimation used in a smoothing process for upstream end temperature estimation based on the operation state of the internal combustion engine, wherein the smoothing coefficient for upstream end temperature estimation is calculated, by the electronic control unit, as a smoothing coefficient corresponding to a case where the operation state of the internal combustion engine is an acceleration state or a smoothing coefficient corresponding to a case where the operation state of the internal combustion engine is not the acceleration state, on the basis of the operation state of the internal combustion engine.

15. The control method according to claim 14, wherein the upstream end temperature is estimated, by the electronic control unit, by dividing a difference between the previously estimated upstream end temperature and a steady-state temperature of the catalyst by the calculated smoothing coefficient for upstream end temperature estimation, and adding the previously estimated upstream end to the resulting quotient.

\* \* \* \* \*